(12) United States Patent
Kubota et al.

(10) Patent No.: US 9,756,193 B2
(45) Date of Patent: Sep. 5, 2017

(54) IMAGE INSPECTING APPARATUS AND IMAGE FORMING APPARATUS

(71) Applicant: Konica Minolta, Inc., Chiyoda-ku, Tokyo (JP)

(72) Inventors: Aiko Kubota, Hino (JP); Daiki Yamanaka, Sagamihara (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/141,920

(22) Filed: Apr. 29, 2016

(65) Prior Publication Data

US 2016/0337529 A1 Nov. 17, 2016

(30) Foreign Application Priority Data

May 12, 2015 (JP) .................................. 2015-097162

(51) Int. Cl.
*H04N 1/04* (2006.01)
*H04N 1/00* (2006.01)
*G03G 15/00* (2006.01)

(52) U.S. Cl.
CPC ..... *H04N 1/00068* (2013.01); *G03G 15/5062* (2013.01); *H04N 1/00013* (2013.01);
(Continued)

(58) Field of Classification Search
CPC .. G01B 15/04; G01N 23/2251; G03F 7/7065; H01J 2237/24578; H01J 2237/2806;
(Continued)

(56) References Cited

U.S. PATENT DOCUMENTS 9,269,178 B2 * 2/2016 Piemonte ............ G01C 21/3635
9,341,584 B2 * 5/2016 Nakahira ............ G01N 23/2251
(Continued)

FOREIGN PATENT DOCUMENTS

JP 2007-261783 A 10/2007
JP 2014-232141 A 12/2014

OTHER PUBLICATIONS

Office Action (Notification of Reasons for Refusal) dated Apr. 11, 2017, by the Japanese Patent Office in corresponding Japanese Patent Application No. 2015-097162, with an English translation of the Office Action. (8 pages).

*Primary Examiner* — Negussie Worku
(74) *Attorney, Agent, or Firm* — Buchanan Ingersoll & Rooney PC

(57) ABSTRACT

A distance between a reference position and a reference image of a sheet is accurately measured without adding a special device even when an attitude of the sheet is not stable. An aspect of the present invention obtains image data by reading a sheet surface formed with the reference image such as a trim mark by a reading portion. A height calculation portion calculates edge-blur amounts of the reference position and the reference image on the sheet surface from the image data. Furthermore, a height calculation portion detects heights from a focus position to the sheet surface for the reference position and the reference image, from the edge-blur amount and a reflected light amount of a white solid portion. Moreover, a distance detection portion calculates a distance between the reference position and the reference image on the sheet surface, on the basis of a detection result.

6 Claims, 13 Drawing Sheets

(52) U.S. Cl.
CPC ....... *H04N 1/0057* (2013.01); *H04N 1/00082* (2013.01); *H04N 1/00801* (2013.01); *H04N 2201/0082* (2013.01)

(58) Field of Classification Search
CPC .. H01J 2237/2817; H01J 37/222; H01J 37/28; H04N 1/0071; H04N 1/00737; H04N 1/00779; H04N 1/02815; H04N 1/4092
USPC ............... 358/448, 474, 496, 497, 488, 486; 382/475, 164, 154
See application file for complete search history.

(56) References Cited

U.S. PATENT DOCUMENTS

| | | | |
|---|---|---|---|
| 2002/0076696 A1* | 6/2002 | Kawaguchi ......... | C12Q 1/6834 435/6.16 |
| 2008/0303936 A1* | 12/2008 | Muramatsu ........ | H04N 5/23293 348/335 |
| 2013/0016885 A1* | 1/2013 | Tsujimoto ............... | G06T 5/003 382/128 |
| 2015/0212019 A1* | 7/2015 | Shishido ................ | G01B 15/04 250/307 |
| 2015/0279033 A1* | 10/2015 | Murakami ............ | G06T 7/0014 382/128 |
| 2016/0209917 A1* | 7/2016 | Cerriteno ................ | G06F 3/013 |
| 2016/0255241 A1* | 9/2016 | Harashima ........... | H04N 1/4092 |
| 2016/0301811 A1* | 10/2016 | Yamaguchi .......... | H04N 1/0071 |

* cited by examiner

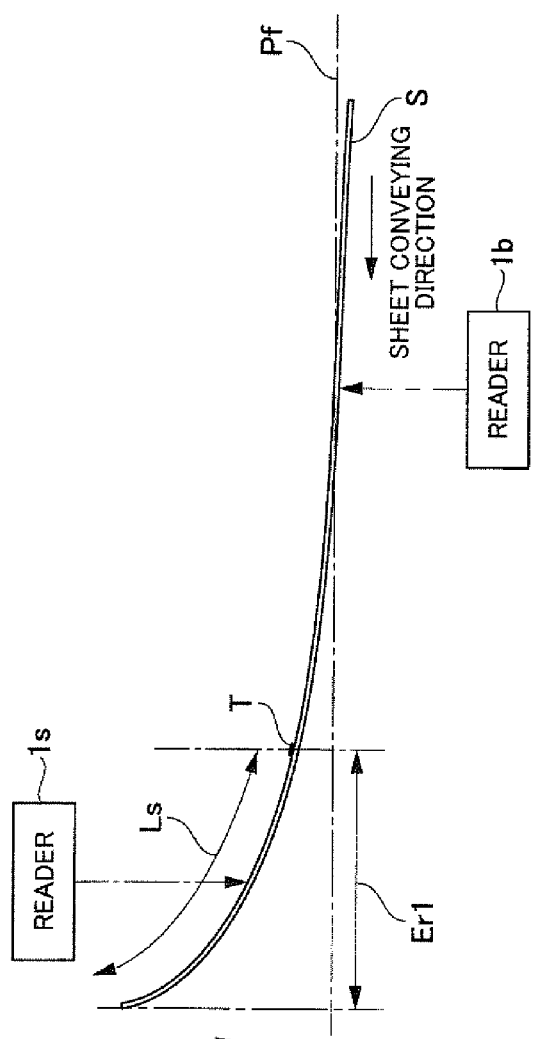
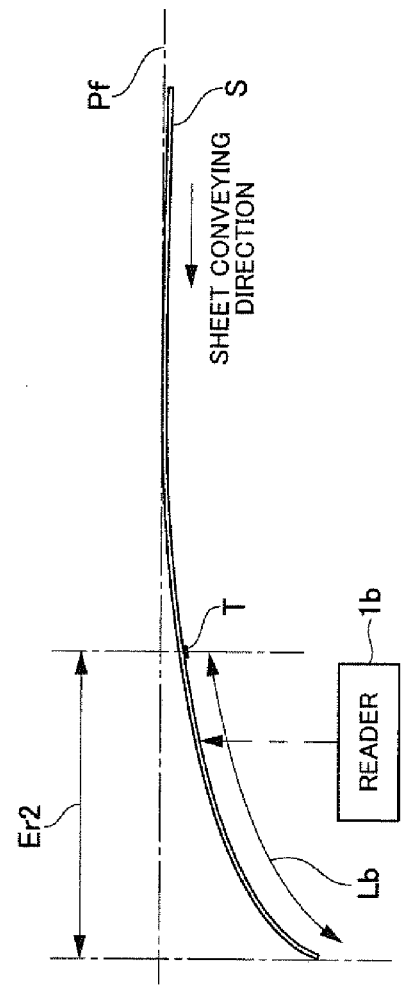
FIG. 1A
FIG. 1B

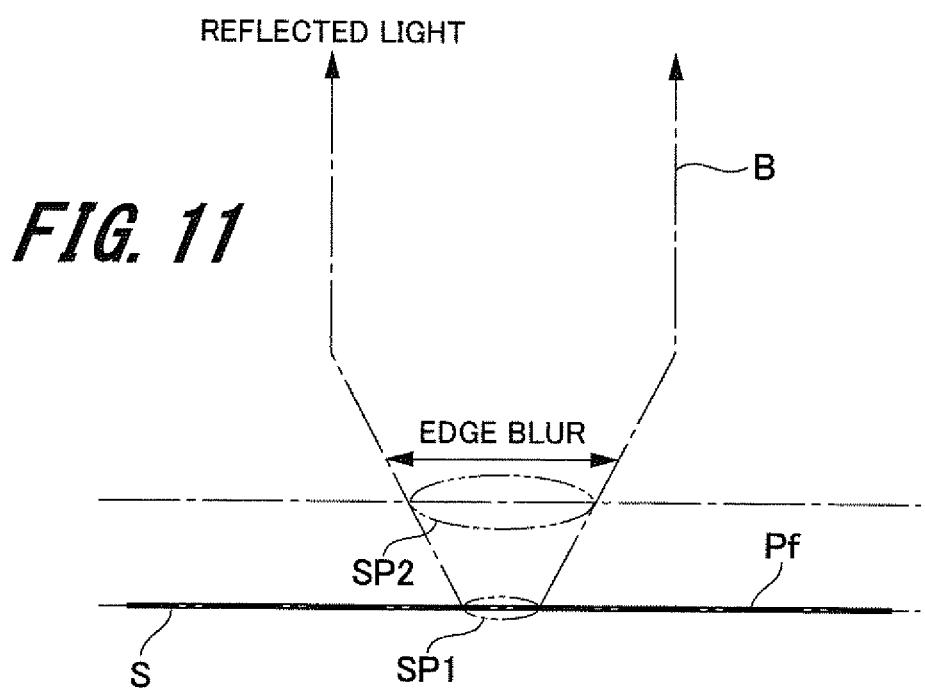

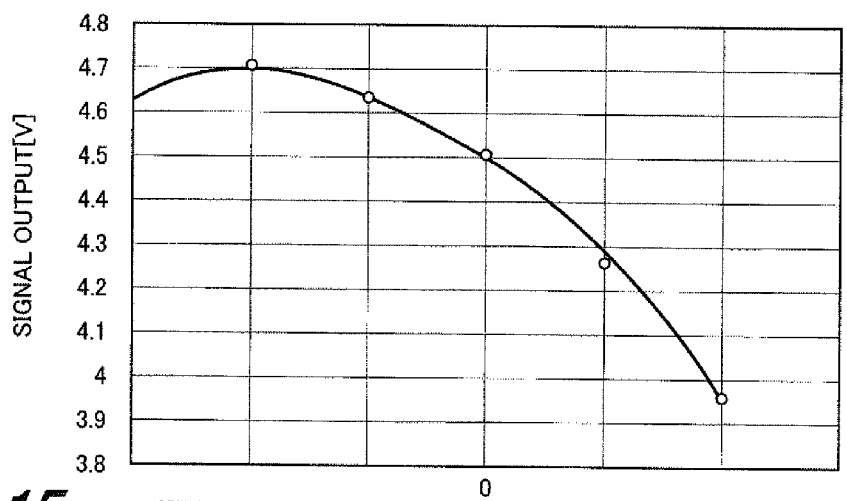
FIG. 15
| | EDGE-BLUR AMOUNT[μm] | WHITE SOLID PORTION LIGHT AMOUNT[V] | DISTANCE FROM FOCUS POSITION[mm] |
|---|---|---|---|
| SHEET END PORTION | 20 | 4.7 | −0.9 |
| TRIM MARK | 60 | 4.1 | +1.9 |
FIG. 16
FIG. 17
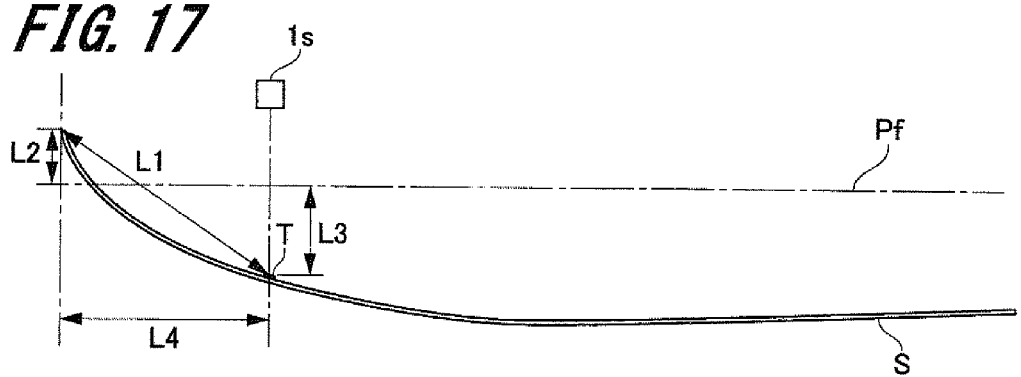

IMAGE INSPECTING APPARATUS AND IMAGE FORMING APPARATUS

BACKGROUND OF THE INVENTION

Field of the Invention

The present invention relates to an image inspecting apparatus for obtaining a distance between a reference position of a sheet and a reference image for alignment formed on the sheet (for example, a trim mark) and an image forming apparatus for correcting an image forming position in accordance with the distance between the reference position and the reference image of the sheet.

Description of the Related Art

In the image forming apparatus, the image forming position of an image formed on a sheet (hereinafter, referred to as "image position") is different from a set position or a forming interval of images in a sheet conveying direction (sub-scanning direction) becomes sometimes uneven among a plurality of sheets continuously passed. Factors for such positional deviation of the images include deviation of a rotating speed of a photoreceptor, a transfer body and the like, deviation of a sheet conveying speed, deviation of feeding-out timing of the sheet, size accuracy of the sheet, contraction of the sheet caused by fixation processing, and the like.

In order to solve the positional deviation of the images, the image forming positions on the sheet are corrected. Usually, an edge of the sheet or the like used as a reference position, and thus a distance between the reference position and the reference image is measured, and the image position is corrected on the basis of the measured distance. However, when the reference image is read, an attitude of the sheet, that is, a height position of a sheet surface can fluctuate due to deformation such as curling of the sheet, waving or the like.

FIGS. 1A and 1B are views showing a method of detecting a distance from the reference position of the sheet to the reference image. FIG. 1A illustrates an example when detection is made by an upper reader, and FIG. 1B illustrates an example when detection is made by a lower reader.

FIG. 1A illustrates a state in which a sheet S is conveyed between an upper reader $1s$ and a lower reader $1b$. The sheet S is curled upward in the vicinity of an end portion (front end portion) on a downstream side in a sheet conveying direction, and a height position of a sheet surface fluctuates. A trim mark T being the reference image is formed on a surface of the sheet S. A reference surface Pf is a surface including positions of focal points (just focused) of optical systems provided by the reader $1s$ and the reader $1b$, respectively. A distance (length) Ls between the front end portion and the trim mark T along the sheet surface is a distance to be detected by the upper reader $1s$. However, actually, a distance Er1 between the front end portion and the trim mark T in the sheet conveying direction is erroneously detected.

Also in FIG. 1B, the sheet S is curled downward in the vicinity of the front end portion, and the height position of the sheet surface fluctuates in the same way as in the case of FIG. 1A. The trim mark T is formed on a rear surface of the sheet S. The distance (length) Lb between the front end portion and the trim mark T along the sheet surface is a distance to be detected by the lower reader $1b$. However, actually, a distance Er2 between the front end portion and the trim mark T in the sheet conveying direction is erroneously detected.

When the height position of the sheet surface fluctuates as above, the distance from the reference position of the sheet to the reference image cannot be measured accurately, which causes a problem in which alignment cannot be performed with accuracy. Particularly, in a one-pass both-side detection region without backup such as a guide member or the like in a sheet conveying path, fluctuation of the height position of the sheet surface is large since the sheet surface vertically moves. Such one-pass both-side detection region as above can be found in the image forming apparatus that forms an image on, for example, both sides of the sheet.

Patent Literature 1 discloses an image forming apparatus having a reading portion that reads a sheet surface formed with a reference image and a measurement portion that measures a height position of the sheet surface at a reading position by the reading portion. The image forming apparatus disclosed in Patent Literature 1 corrects a distance between the measured reference position and the reference image of the sheet to a distance in a case where the sheet surface is flat in accordance with the height position measured by the measurement portion, and aligns the image in accordance with the corrected distance. In the image forming apparatus described in Patent Literature 1, even when the sheet is deformed, alignment can be performed by the distance between the reference position in the case where the sheet surface is flat and the reference image, and thus accurate alignment is possible.

RELATED ART DOCUMENT

Patent Document

Patent Literature 1: Japanese Patent Laid-Open Publication No. 2014-232141

DISCLOSURE OF THE INVENTION

Problems to be Solved by the Invention

However, in the image forming apparatus described in Patent Literature 1, the measurement portion for measuring the height position of the sheet surface is installed separately from the reading portion. It is necessary to ensure a space for arranging the measurement portion in addition to the reading portion in the image forming apparatus or, particularly, on a downstream side of a fixing device in the sheet conveying direction. Furthermore, it becomes necessary to manage not only a reading result by the reading portion but also a measurement result by the measurement portion.

In view of the aforementioned circumstances, there is desired accurate measurement of a distance between the reference position of the sheet and the reference image without adding a special device even if the sheet attitude is not stable.

SUMMARY OF THE INVENTION

Means for Solving the Problem

An image inspecting apparatus according to an aspect of the present invention includes a reading portion, a storage portion, and a control portion.

The reading portion irradiates, with light, a sheet surface of a sheet formed with a reference image for alignment with light and obtains image data by reading the sheet surface by receiving light reflected on the sheet surface.

The storage portion previously stores a first correlation between an edge-blur amount of a rising edge portion and/or a falling edge portion of the image data obtained using the reading portion and a distance from a focal point of the reading portion to the sheet surface.

The control portion calculates the edge-blur amount from the image data obtained by the reading portion, calculates heights of the reference position and the reference image of the sheet, using the focal point of the reading portion as a base point from the calculated edge-blur amount and the first correlation stored in the storage portion. Then, the control portion calculates a distance between the reference position and the reference image on the sheet surface by using the heights of the reference position and the reference image and the distance between the reference position and the reference image in a sheet conveying direction.

An image forming apparatus according to an aspect of the present invention includes an image forming portion, a reading portion, a storage portion, and a control portion.

The image forming portion forms an image on the sheet.

The reading portion irradiates, with light, the sheet surface of the sheet formed with a reference image for alignment by the image forming portion and obtains image data by reading the sheet surface by receiving light reflected on the sheet surface.

The storage portion previously stores a first correlation between an edge-blur amount of a rising edge portion and/or a falling edge portion of the image data obtained using the reading portion and a distance from a focal point of the reading portion to the sheet surface.

The control portion measures the distance between the reference position and the reference image on the sheet surface read by the reading portion, and corrects the image forming position of the sheet in accordance with the distance.

The control portion calculates the edge-blur amount from the image data obtained by the reading portion, calculates heights of the reference position and the reference image, using the focal point of the reading portion as a base point on the basis of the calculated edge-blur amount and the first correlation stored in the storage portion, and calculates a distance between the reference position and the reference image on the sheet surface by using the heights of the reference position and the reference image and the distance between the reference position and the reference image in a sheet conveying direction.

Effects of the Invention

According to the image inspecting apparatus and the image forming apparatus of, at least, the one aspect of the present invention, the distance between the reference position and the reference image of the sheet can be accurately measured without adding a special device even when the sheet attitude is not stable. Therefore, in the image forming apparatus, accurate correction of the image forming position of the sheet can be made by using the accurately measured distance between the reference position and the reference image of the sheet.

BRIEF DESCRIPTION OF THE DRAWINGS

FIGS. 1A and 1B are views showing a method of detecting a distance from a reference position of a sheet to a reference image according to an embodiment of the present invention.

FIG. 11 is a view showing abeam spot output from a light source provided in the reader.

FIG. 15 is a graph showing an example of a relation between a signal output that is output from the reader and the distance between the focus position and the reading surface.

FIG. 16 is a table showing a measurement result of each item of the sheet end portion and the reference image.

FIG. 17 is a view showing a method of calculating a distance between the sheet end portion and the reference image on the basis of the measurement result in FIG. 16.

DESCRIPTION OF THE PREFERRED EMBODIMENTS

Figure 2:
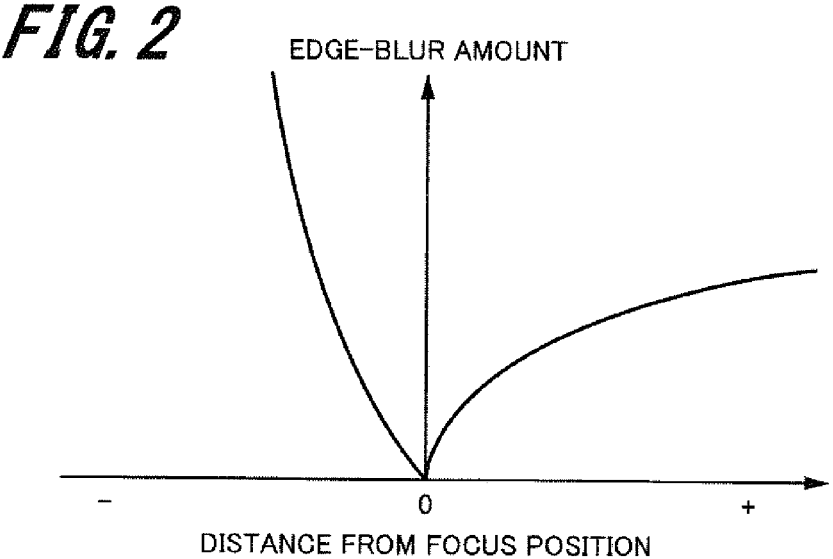
FIG. 2 is a view showing an outline of a correlation between an edge-blur amount and a distance between a focus position and a reading surface in relation to a method of detecting a height of a sheet surface according to the embodiment of the present invention.

Hereinafter, an embodiment of the present invention will be described in detail by using the attached drawings. Note that, in the following descriotin or each figure, the same reference numerals are attached to the same elements or elements having the same function, and duplicated descpition will be omitted.

<1. Embodiment>
[Outline of the Embodiment]

In the embodiment, when a distance between two points (a sheet end portion or a trim mark position) on a sheet whose attitude is unstable is to be detected, a height of a sheet surface at each point is detected from an edge-blur amount and a reflected light amount from a white solid portion, the distance between the two points is corrected on the basis of the detection result, and a correct detected distance is calculated.

Figure 7:
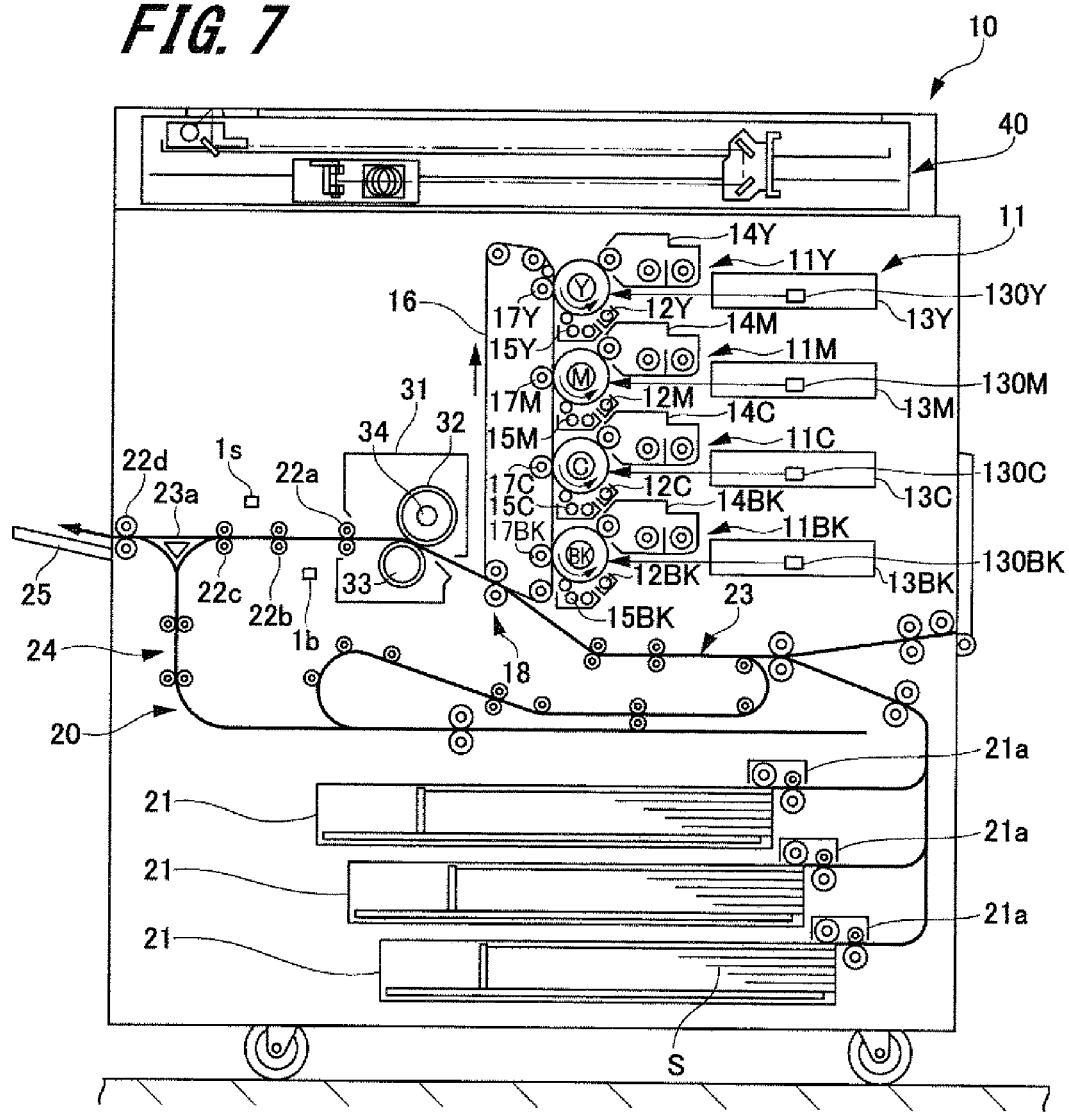
FIG. 7 is an entire configuration view showing an example of an image forming apparatus to which an image inspecting apparatus according to the embodiment of the present invention is applied.

FIG. 2 is a view showing an outline of a correlation between the edge-blur amount and the distance between a focus position and the reading surface, in relation to a method of detecting a height of the sheet surface according to the embodiment of the present invention. The focus position is a position of a focal point of an optical system provided in readers 1s and 1b (FIG. 7).

Figure 3:
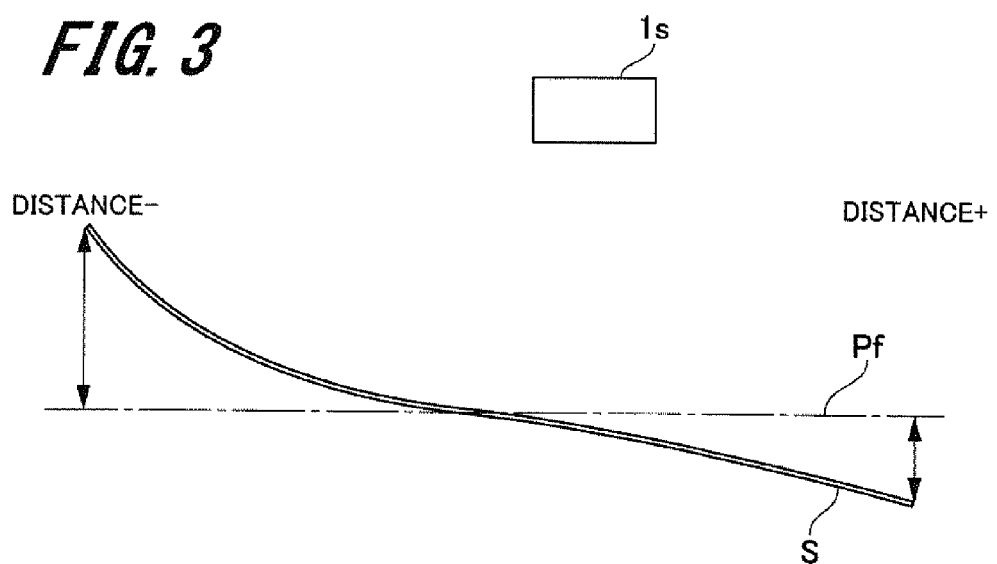
FIG. 3 is a view showing that there are two distances each between the focus position and the reading surface corresponding to the same edge-blur amount.

FIG. 3 is a view showing that there are two distances between the focus position and the reading surface corresponding to the same edge-blur amount.

As shown in a characteristic diagram of FIG. 2, the distance between the focus position and the reading surface of the reader is obtained on the basis of the edge-blur amount. However, a correlation between the edge-blur amount and the distance from the focus position to the reading surface of the reader is not unique. That is, as shown in FIG. 3, there are two distances between the focus position and the reading surface of the reader, corresponding to the same edge-blur amount. In FIGS. 2 and 3, a side on which the sheet surface of the sheet S is closer to the reader with respect to a focus (reference surface Pf) of the reader (the reader 1s in FIG. 2) is indicated by (−), whereas the farther side is indicated by (+). In the example in FIG. 3, since a front end portion of the sheet S is deformed upward and the distance between the sheet surface and the upper reader 1s becomes short, the distance is indicated by a "distance −". Furthermore, since, at a portion far from the front end portion of the sheet S, the distance between the sheet surface and the upper reader 1s is large, the distance is indicated by a "distance +".

Here, an edge blur will be described.

Figure 4:
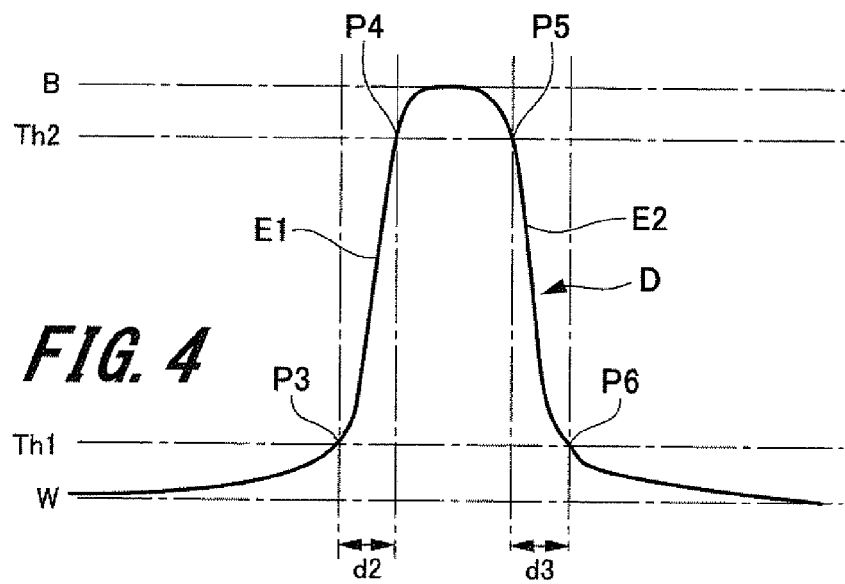
FIG. 4 is a view for explaining the edge blue amount.

FIG. 4 is a view for explaining the edge-blur amount and shows an example of image data (profile data) obtained by reading the sheet surface of the sheet S by the readers 1s and 1b. The image data is obtained by reading the sheet S formed with a linear image by the reader while conveying the sheet S in a direction orthogonal to the image. As shown in FIG. 4, image data D is obtained having a signal waveform at a high potential Hi level at a forming position of an image which is a black solid portion B having a small reflectance and at a low potential Low level at the non-forming position of the image which is a sheet white part W having a large reflectance. In FIG. 4, a horizontal axis indicates elapse of time and a vertical axis indicates the potential according to the reflectance. The image data D obtained as such a signal waveform is also referred to as profile data.

The magnitude of inclination of rising edge portion E1 of the image data is indicated by a distance between two intersections where the image data D at the rising edge portion E1 intersects two thresholds with different values. The distance is referred to as the edge blur. The same applies to a falling edge portion E2. The edge blur is an index indicating clearness of the image data.

In order to obtain the edge blur, a lower-limit threshold Th1 and an upper-limit threshold Th2 are calculated from the image data D obtained by the reader. In the example, it is assumed that the lower-limit threshold Th1 is 10% of a peak of the image data D and the upper-limit threshold Th2 is 90% of the peak of the image data D, but the value of each threshold is not limited to that.

In the rising edge portion E1, there are calculated an intersection P3 where the image data D and the lower-limit threshold Th1 intersect with each other, and an intersection P4 where the image data D and the upper-limit threshold Th2 intersect with each other. Then, time from the intersection P3 to the intersection P4 is multiplied by a conveying speed of the sheet S, and thus a distance d2 from the intersection P3 to the intersection P4 is obtained as a value of the edge-blur amount in the rising edge portion E1.

Furthermore, in the falling edge portion E2, there are calculated an intersection P5 where the image data D and the upper-limit threshold Th2 intersect with each other, and an intersection P6 where the image data D and the lower-limit threshold Th1 intersect with each other. Then, time from the intersection P5 to the intersection P6 is multiplied by the conveying speed of the sheet S, and thus a distance d3 from the intersection P5 to the intersection P6 is obtained as a value of the edge-blur amount in the falling edge portion E2. In the example, an average d4 (d4=(d2+d3)/2) of the distance d2 and the distance d3 is assumed to be the value of the edge-blur amount in the image data D.

Figure 5:
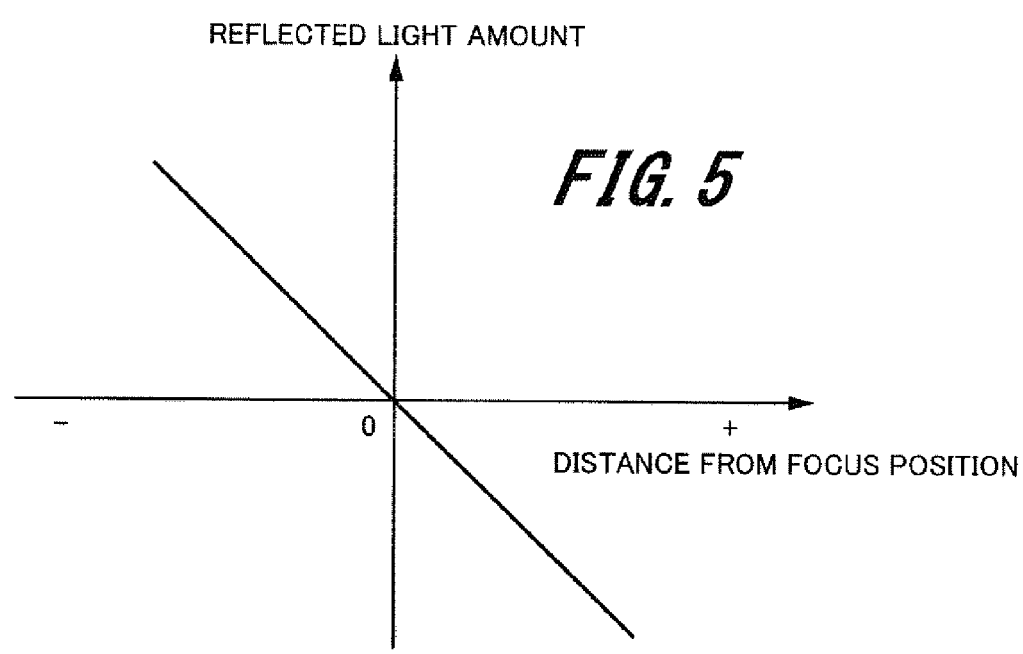
FIG. 5 is a graph showing a relation between a reflected light amount and the distance between the focus position and the reading surface.

FIG. 5 is a graph showing a relation between a reflected light amount and the distance between the focus position and the reading surface. As shown in FIG. 3, there are two distances (distance + and distance −) between the focus position and the reading surface of the reader, corresponding to the same edge-blur amount. In the embodiment, determination on the distance + and the distance − is made on the basis of the reflected light amount received by the reader.

Figure 9:
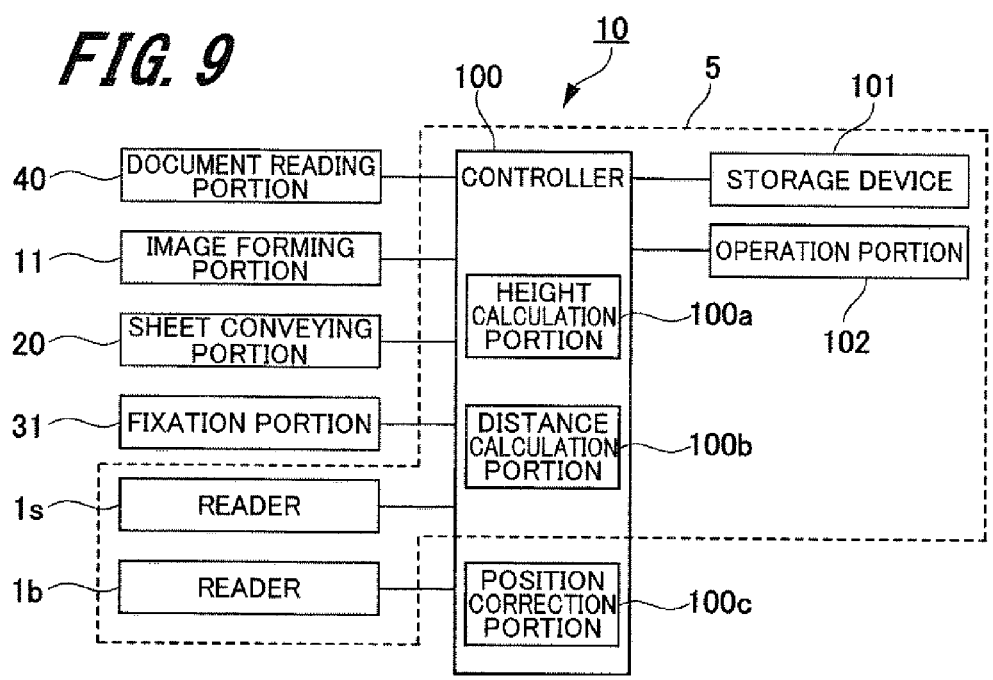
FIG. 9 is a block diagram showing a hardware configuration example of the image forming apparatus according to the embodiment of the present invention.

The closer to the reader (for example, the reader 1s in FIG. 3) a reflected surface, namely, the sheet surface is, the more reflected light amount the reader receives. Therefore, the reflected light amount at the focus position of the white solid portion to be a reference is previously measured and stored in a storage device 101 (FIG. 9 which will be described later). In FIG. 5, the value of the reflected light amount when the sheet surface is at the focus position (distance 0) is assumed to be 0. According to FIG. 5, as the sheet surface gets closer to the reader (distance −), the reflected light amounted becomes positive, whereas as the sheet surface gets away from the reader (distance +), the reflected light amount becomes negative.

Figure 6:
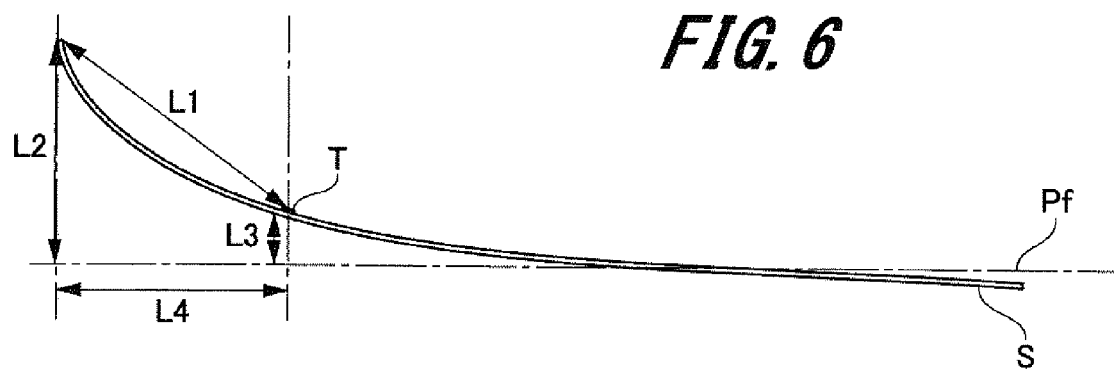
FIG. 6 is a view showing a method of calculating a distance between a sheet end portion and the reference image.

FIG. 6 is a view showing a method of calculating the distance between the sheet end portion and the reference image.

The distance between the sheet end portion and the reference image (trim mark T) is calculated by using the distance (height) between the sheet surface calculated by the aforementioned FIGS. 2 to 5 and the reference surface Pf (focus position). It is assumed that the distance (height) from the reference surface Pf to the sheet end portion is L2, the distance from the reference surface Pf to the trim mark T is L3, the distance between the reference position and the trim mark T in the sheet conveying direction (direction in parallel with the reference surface Pf) is L4, and the distance between the sheet end portion along the sheet surface and the trim mark T is L1. At this time, a relation among the distances L1 to L4 is expressed by an equation (1) by using the Pythagorean theorem:

$$(L1)^2 = (L4)^2 + (L2-L3)^2 \qquad (1).$$

[Entire Configuration Example of Image Forming Apparatus]

Subsequently, entire configuration of the image forming apparatus will be described.

FIG. 7 is an entire configuration view showing an example of the image forming apparatus to which the image inspecting apparatus according to the embodiment of the present invention is applied. The configuration shown in FIG. 7 is an example and the configuration of the image forming apparatus is not limited to that.

First, the entire configuration of the image forming apparatus 10 will be described. The image forming apparatus 10 is an electrophotographic image forming apparatus such as a copying machine, and in the example, is a so-called tandem-type color image forming apparatus that forms a full-color image by aligning a plurality of photoreceptors in a vertical direction so as to face a single intermediate transfer belt.

The image forming apparatus 10 includes an image forming portion 11, a sheet conveying portion 20, a fixation portion 31, the upper reader 1s, the lower reader 1b, and a document reading portion 40.

The image forming portion 11 is an example of an image forming means and includes an image forming portion 11Y for forming an image of yellow (Y), an image forming portion 11M for forming an image of magenta (M), an image forming portion 11C for forming an image of cyan (C), and an image forming portion 11BK for forming an image of black (BK).

The image forming portion 11Y includes a photoreceptor drum Y and a charging portion 12Y arranged therearound, an optical writing portion 13Y having a laser diode 130Y, a development apparatus 14Y, and a drum cleaner 15Y. Similarly, the image forming portions 11M, 11C, and 11BK include photoreceptor drums M, C, and BK and charging portions 12M, 12C, and 12BK arranged therearound, optical writing portions 13M, 13C, and 13BK having laser diodes 130M, 130C, and 130BK, development apparatuses 14M, 14C, and 14BK, and drum cleaners 15M, 15C, and 15BK.

The photoreceptor drum Y has its surface uniformly charged by the charging portion 12Y, and a latent image is formed on the photoreceptor drum Y by scanning exposure by the laser diode 130Y of the optical writing portion 13Y. Furthermore, the development apparatus 14Y develops the latent image on the photoreceptor drum Y through development with toners. As a result, a toner image of a predetermined color corresponding to yellow is formed on the photoreceptor drum Y.

The photoreceptor drum M has its surface uniformly charged by the charging portion 12M, and a latent image is formed on the photoreceptor drum M by scanning exposure by the laser diode 130M of the optical writing portion 13M. Furthermore, the development apparatus 14M develops the latent image on the photoreceptor drum M through development with toners. As a result, a toner image of a predetermined color corresponding to magenta is formed on the photoreceptor drum M.

The photoreceptor drum C has its surface uniformly charged by the charging portion 12C, and a latent image is formed on the photoreceptor drum C by scanning exposure by the laser diode 130C of the optical writing portion 13C. Furthermore, the development apparatus 14C develops the latent image on the photoreceptor drum C through development with toners. As a result, a toner image of a predetermined color corresponding to cyan is formed on the photoreceptor drum C.

The photoreceptor drum BK has its surface uniformly charged by the charging portion 12BK, and a latent image is formed on the photoreceptor drum BK by scanning exposure by the laser diode 130BK of the optical writing portion 13BK. Furthermore, the development apparatus 14BK develops the latent image on the photoreceptor drum BK through development with toners. As a result, a toner image of a predetermined color corresponding to black is formed on the photoreceptor drum BK.

The toner images formed on the photoreceptor drums Y, M, C, and BK are sequentially transferred by primary transfer rollers 17Y, 17M, 17C, and 17BK to predetermined positions on the intermediate transfer belt 16 which is a belt-shaped intermediate transfer body. The toner image composed of each color transferred on the intermediate transfer belt 16 is transferred by a secondary transfer portion 18 to the sheet S conveyed by the sheet conveying portion 20 at predetermined timing.

In the image forming apparatus 10 of the embodiment, an image forming position of the sheet is set on the basis of the distance between the sheet end portion obtained by reading the reference image and the reference image. In this case, if the distance between the sheet end portion and the reference image cannot be accurately obtained, the image forming position of the sheet cannot be correctly set. Accordingly, an image inspecting method using the aforementioned readers 1s and 1b is executed, and thus the distance between the sheet end portion and the reference image can be obtained accurately.

The sheet conveying portion 20 includes a plurality of sheet feeding trays 21 in which the sheet S is stored in the example and a sheet feeding portion 21a that feeds out the sheet S stored in the sheet feeding tray 21. Furthermore, the sheet conveying portion 20 also includes a main conveying path 23 on which the sheet S fed out from the sheet feeding tray 21 is conveyed, a reversing conveying path 24 that reverses the sheet S upside down, and a sheet discharge tray 25 from which the sheet S is discharged.

In the sheet conveying portion 20, the reversing conveying path 24 branches from the main conveying path 23 on the downstream side of the fixation portion 31 and a switching gate 23a is provided at a branch section between the main conveying path 23 and the reversing conveying path 24. In the image forming apparatus 10, the sheet S conveyed on the main conveying path 23 and passing through the secondary transfer portion 18 and the fixation portion 31 has an image formed on a surface directed upward. When an image is to be formed on both surfaces of the sheet S, the sheet S on which the image is formed on one surface directed upward is conveyed from the main conveying path 23 to the reversing conveying path 24 and is conveyed from the reversing conveying path 24 to the main conveying path 23, and thus the image forming surface is directed downward. Accordingly, the sheet S is reversed upside down, and an image can be formed on the other surface directed upward.

The fixation portion 31 is an example of a fixing means and performs fixation processing for fixing an image on the sheet S to which the image has been transferred. The fixation portion 31 conveys the sheet S and also performs pressure fixation by a pair of fixing rollers 32 and 33 and thermal fixation by a fixing heater 34 to thereby fix the image on the sheet S.

The document reading portion 40 performs scanning exposure to the image on the document by using the optical system of a scanning exposure device and reads its reflected light by a line image sensor to thereby obtain an image signal. The image forming apparatus 10 may have a configuration that includes an automatic document conveying device, not shown, for feeding the document on an upper part.

The readers 1s and 1b read a predetermined reference image from the sheet S to which the image has been transferred by the secondary transfer portion 18 and fixed by the fixation portion 31. In order to read the reference image formed on the both surfaces of the sheet S, the readers 1s and 1*b* are provided on an upper part and a lower part of the main conveying path 23 on the downstream The readers 1*s* and 1*b* side of the fixation portion 31 and on the upstream side of the switching gate 23*a* in the example.

Figure 8:
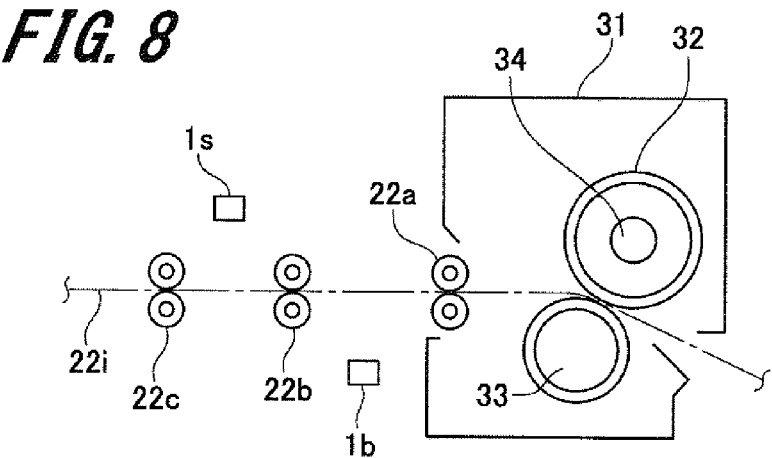
FIG. 8 is a view showing peripheries of an upper reader and a lower reader in FIG. 7.

FIG. 8 is a view showing peripheries of the upper reader 1*s* and the lower reader 1*b* in FIG. 7.

The upper reader 1*s* is provided on the downstream side of the lower reader 1*b*. The upper reader 1*b* and the lower reader 1*b* are arranged on the downstream side of a conveying roller 22*a* arranged at an outlet of the fixation portion 31. A conveying roller 22*b* is arranged between the reader 1*b* and the reader 1*s*, and a conveying roller 22*c* is arranged between the reader 1*s* and the upstream side of the switching gate 23*a*. By arranging the conveying rollers 22*a* to 22*c*, a one-pass both-surface detection region is formed without using backup such as a guide member or the like. An ideal sheet conveying path 22*i* indicates a linear path when the sheet S passes between the conveying rollers 22*a* to 22*c* without deformation.

Note that the readers 1*s* and 1*b* may be line sensors that detect color information and reflectance information of the image formed by the image forming portion 11. The line sensor is a sensor obtained by linearly aligning a plurality of photoelectric conversion elements along a main scanning direction. Alternatively, the readers 1*s* and 1*b* may be image sensors in which the photoelectric conversion elements are arranged in a matrix manner. A CCD-type image sensor or a CMOS-type (including a MOS type) image sensor can be utilized as the line sensor and the image sensor. Alternatively, the readers 1*s* and 1*b* may be optical sensors that detect the reflectance information of the image formed by the image forming portion 11.

[Functional Configuration Example of Image Forming Apparatus]

FIG. 9 is a block diagram showing a hardware configuration example of the image forming apparatus according to the embodiment of the present invention. In the block diagram, elements or their related elements considered to be necessary in explaining the embodiment are described, and the image forming apparatus 10 is not limited to the example.

Here, in FIG. 9, there will be explained control functions relating to: an operation for writing the reference image, an operation for obtaining the distance between the sheet end portion and the reference image by reading the reference image, and an operation for setting an image forming position of the sheet in accordance with the obtained distance between the sheet end portion and the reference image.

The image forming apparatus 10 includes a controller 100 that performs a series of control of feeding the sheet S, forming an image, and discharging the sheet, and a storage device 101. The controller 100 is an example of the control portion and includes a microprocessor referred to as a CPU or an MPU, and a memory such as a RAM, a ROM or the like. The ROM or the storage device 101 stores a program executed by the CPU or the MPU of the controller 100.

The storage device 101 is an example of the storage portion and stores data used when the CPU or the MPU of the controller 100 executes the program, data obtained by executing the program, or the like. For example, the storage device 101 previously stores the correlation between the edge-blur amounts of the rising edge portion and/or the falling edge portion of the image data (profile data) obtained by using the readers 1*b* and 1*s* and the distance from the focal points of the readers 1*b* and 1*s* to the sheet surface. Furthermore, the storage device 101 previously stores the correlation between the reflected light amount received by the readers 1*s* and 1*b* and the distance from the focal points of the readers 1*s* and 1*b* to the sheet surface.

The operation portion 102 is used for performing various settings relating to the image forming apparatus 10. The operation portion 102 is a touch panel and has a configuration in which display and operations can be processed in parallel. Note that the operation function may be located anywhere, not being limited to the touch panel, as long as the operation function can be provided.

The readers 1*s* and 1*b* irradiates, with light, the sheet surface of the sheet formed with the reference image for alignment and obtains image data by reading the sheet surface by receiving light reflected on the sheet surface.

An ordinary operation for forming the image on the sheet S by the image forming apparatus 10 will be described. The controller 100 conveys the sheet S by controlling the sheet conveying portion 20. The controller 100 forms an image on the sheet S by controlling the image forming portion 11 on the basis of the image data obtained from the document by the document reading portion 40 or the image data obtained from the outside. Furthermore, the controller 100 causes the image to be fixed on the sheet S by control of the fixation portion 31, and causes the sheet S formed with the image to be discharged.

The controller 100 includes a height calculation portion 100*a*, a distance calculation portion 100*b*, and a position correction portion 100*c*. The controller 100 executes the program stored in the ROM or the storage device 101 to thereby realize each function.

The height calculation portion 100*a* calculates the edge-blur amounts of trim marks T1 and T4 from the image data obtained by the readers 1*s* and 1*b*. Then, the height calculation portion 100*a* calculates the heights of the reference position and the trim marks T1 and T4 of the sheet S, using the focal points of the readers 1*s* and 1*b* as the base points, from the calculated edge-blur amounts and the correlation between the edge-blur amount stored in the storage device 101 and the distances from the focal points of the readers 1*s* and 1*b* to the sheet surface.

The distance calculation portion 100*b* calculates the distance between the reference position and the trim marks T1 and T4 on the sheet surface, by using the heights of the reference position (sheet end portion) and the trim marks T1 and T4 and the distances between the reference position and the trim marks T1 and T4 in the sheet conveying direction. In the embodiment, an average value of the distance between the reference position and the trim mark T1 on the sheet surface and the distance between the reference position and the trim mark T4 is assumed to be a distance between the reference position and the trim mark in the sheet conveying direction.

The position correction portion 100*c* sets a position correction parameter for correcting the image forming position of the sheet in the sheet conveying direction on the basis of the calculated distance between the reference position and the reference image on the sheet surface.

The height calculation portion 100*a*, the distance calculation portion 100*b*, the storage device 101, and the readers 1*s* and 1*b* of the controller 100 constitute an image inspecting apparatus 5 that detects a positional deviation of an image.

[Detection of Trim-Mark Position on Sheet]

When the image forming positions on the both surfaces of the sheet are to be adjusted at set-up of the image forming apparatus 10 or the like (hereinafter, referred to as "front/back position adjustment"), a reference image is formed on the sheet for adjustment if the user presses down a front/back position adjustment button, not shown, displayed on the touch panel of the operation portion 102.

Figure 10A:
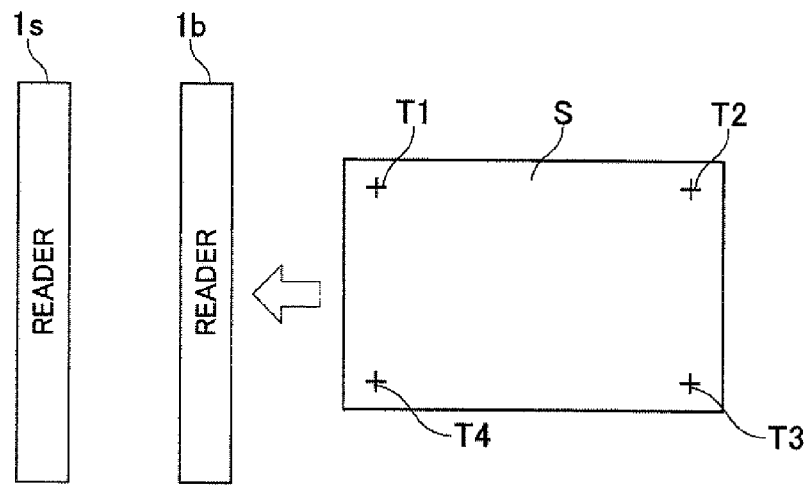
FIGS. 10A and 10B illustrate examples of the reference image for alignment.
Figure 10B:
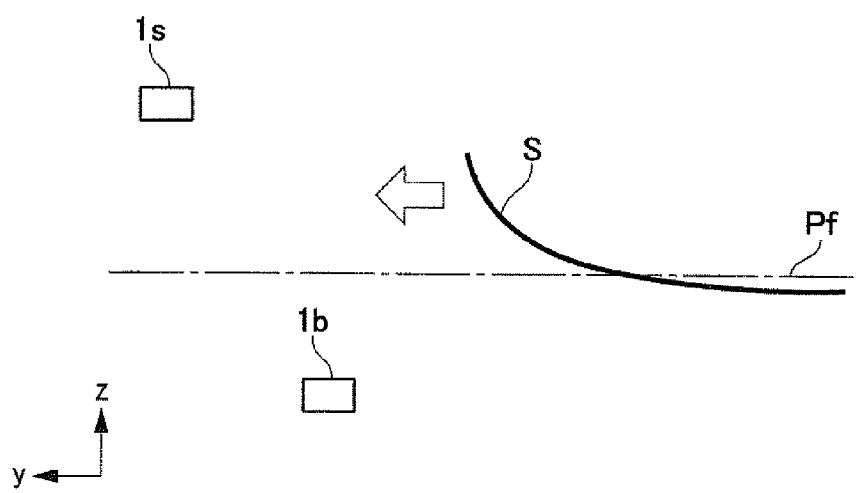

FIGS. 10A and 10B illustrate examples of the reference image for alignment. FIG. 10A is a view of the sheet S on which the reference image (trim mark) is formed, the upper reader 1s and the lower reader 1b when seen from above. FIG. 10B is a view of the sheet S conveyed between the upper reader 1s and the lower reader 1b when seen from a side.

A cross image referred to as a trim mark is generally used as the reference image for alignment, but it is not limited to the trim mark as long as alignment of the both surfaces is possible.

When the trim mark is used, the image forming portion 11 forms the trim marks T1 to T4 at positions where distances in a main-scanning direction x and a sub-scanning direction y from the end portions by using the end portions at four corners of the sheet S as reference positions are constant distances as shown in FIG. 10A. The trim marks T1 to T4 are printed in the vicinity of about 250 mm from the end portions in the sheet conveying direction, on both surfaces of the sheet for alignment of, for example, the Japanese B5 size (182 mm×257 mm). In other words, the trim marks T1 and T4 are formed at positions of 7 mm from front end portions of the sheet S, and the trim marks T2 and T3 are formed at positions of 7 mm from rear end portions. The image forming apparatus 10 performs the fixation processing on the sheet S by the fixation portion 31 after the trim marks T1 to T4 are formed on the sheet S. In addition, after the fixation, the sheet S formed with the trim marks T1 to T4 is conveyed to the readers 1s and 1b on the downstream side of the conveying path (FIG. 10B). Then, the image data (profile data) of the sheet S is obtained by using the readers 1s and 1b.

FIG. 11 is a view showing a beam spot output from a light source provided in the reader.

Figure 12:
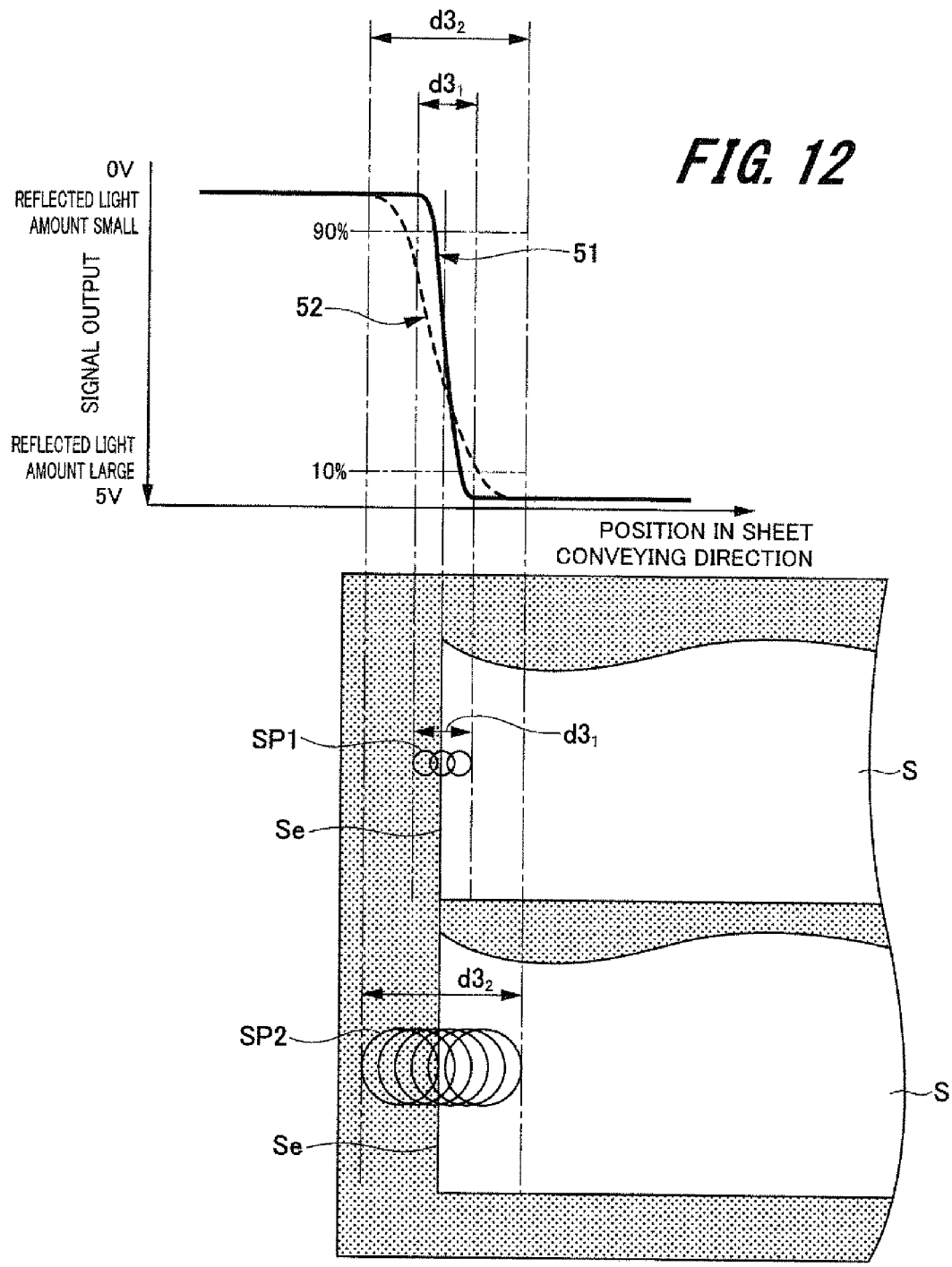
FIG. 12 is a view showing image data (profile data) of the sheet end portion obtained by the reader.

FIG. 12 is a view showing the image data (profile data) of the sheet end portion obtained by the reader. In FIG. 12, the horizontal axis indicates a position in the sheet conveying direction, and the vertical axis indicates a signal output [V].

Figure 13:
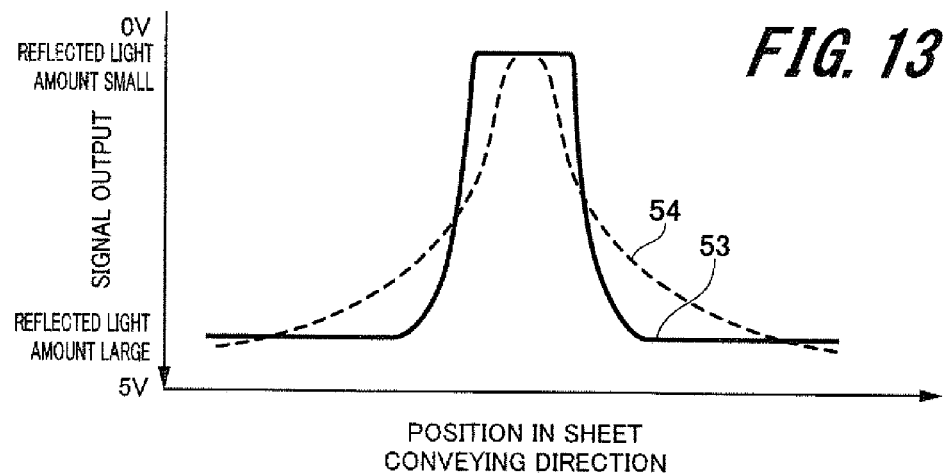
FIG. 13 is a graph showing the image data (profile data) of a trim mark portion obtained by the reader.

FIG. 13 is a graph showing the image data (profile data) of a trim mark portion obtained from the reader. In FIG. 13, the horizontal axis indicates a position in the sheet conveying direction, and the vertical axis indicates a signal output [V].

Figure 14:
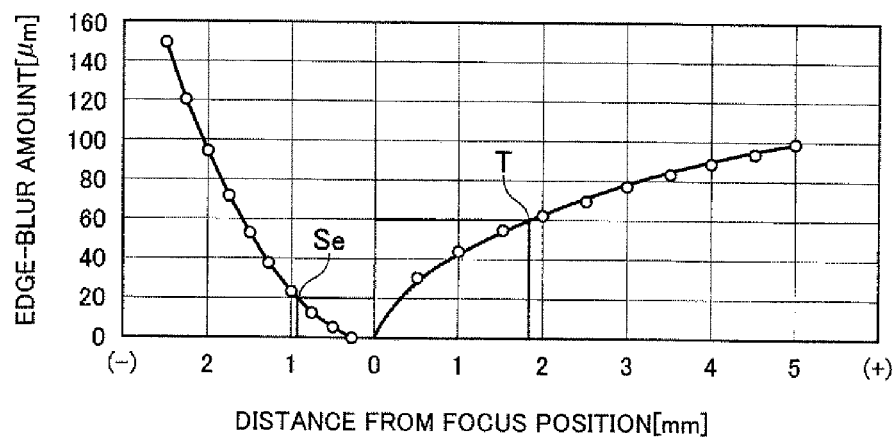
FIG. 14 is a graph showing an example of a correlation between the edge-blur amount and the distance between the focus position and the reading surface.

FIG. 14 is a graph showing an example of the correlation between the edge-blur amount and the distance between the focus position and the reading surface.

FIG. 15 is a graph showing an example of a relation between a signal output that is output from the reader and the distance between the focus position and the reading surface.

The controller 100 conveys the sheet for adjustment on which the trim marks T1 to T4 are drawn at positions of 250 mm from the sheet end portions on the both surfaces of the sheet S and obtains a passage time of the sheet end portion and the passage time of the trim mark position by the readers 1s and 1b, during an operation of front-back position adjustment control. At this time, the controller 100 obtains the image data of the trim mark formed on the sheet S (FIG. 13), the image data of the sheet end portion (upper figure in FIG. 12), and a reflection output characteristic of a white solid portion (FIG. 15). The distance between (corresponding to L4 in FIG. 6) the sheet end portion and the trim mark is converted from the passage time of each position and a sheet conveying speed (for example, 460 mm/s). The signal output of the readers 1s and 1b to the white solid portion at the focus position (reference surface Pf) is previously input into the storage device 101. In the example in FIG. 15, the signal output of the white solid portion at the focus position is 4.5 V. A threshold value of the edge-blur amount is set to, for example, 90% and 10% of the maximum value of the image data as thresholds (upper figure in FIG. 12).

A diameter of a beam spot SP1 (FIG. 11) of a beam output from a light source (not shown) provided in the reader is, for example, 10 µm. The focus position (reference surface Pf) is read out for the sheet end portion Se, and the edge-blur amount $d3_1$ of image data 52 at the sheet end portion Se was 20 µm (FIG. 12). At this time, the signal output of the white solid portion at the sheet end portion Se was 4.7 V. Note that image data 51 has ideal signal output characteristics of image data of an extremely small edge-blur amount. In a lower figure in FIG. 12, an edge-blur amount $d3_2$ when the sheet end portion Se is read at a beam spot SP2 deviating from the focus position is also shown for comparison. Actually, data on the edge-blur amount of the sheet end portion Se is obtained at the beam spot SP1.

On the other hand, a diameter of the beam spot SP2 deviating from the focus position is larger than the diameter of the beam spot SP1. The trim mark was read at the position deviating from the focus positon, and the edge-blur amount of image data 54 of the trim mark (FIG. 13) was 60 µm. Therefore, the edge-blur amount of the image data 54 of the trim mark is larger than the edge-blur amount (20 µm) of the image data 52 at the sheet end portion Se. At this time, the signal output of the white solid portion at a trim mark portion was 4.1 V. Note that image data 53 has ideal signal output characteristics of the image data of an extremely small edge-blur amount.

When the sheet surface of the sheet S is read by the reader, if the distance between the reader and the sheet S deviates from the reference position (focus position) previously determined, a rising angle becomes gentler in the rising edge portion of the image data, and clearness of the image data is lowered. The same also applies to the falling edge portion.

In the measurement this time, the signal output of the white solid portion at the sheet end portion Se is 4.7 V, and it is larger than the signal output at the focus position shown in FIG. 15. Therefore, the distance from the focus position of the sheet end portion Se is on the negative side, that is, in a direction getting closer than the focus position. Accordingly, since the edge-blur amount of the image data 52 of the sheet end portion Se is 20 µm, the distance from the focus position of the sheet end portion Se is approximately −0.9 mm by using the negative conversion formula from FIG. 14.

Furthermore, the signal output of the white solid portion at the trim mark is 4.1 V and is smaller than the signal output at the focus position shown in FIG. 15. Accordingly, the distance of the trim mark from the focus position is on the positive side, that is, in a direction getting away from the focus position. Therefore, since the edge-blur amount of the image data 54 of the trim mark is 60 µm, the distance of the trim mark from the focus position is approximately +1.9 mm by using the positive conversion formula from FIG. 14.

[Measurement Result]

FIG. 16 is a table showing a measurement result of each item of the sheet end portion Se and the trim mark.

In the table in FIG. 16, the measurement results of the edge-blur amount [µm], the white solid portion light amount [V], and the distance [mm] from the focus position are described. The controller 100 obtains the distance between the sheet end portion Se and the trim mark by using the value described in the "distance from the focus position".

FIG. 17 is a view showing a method of calculating a distance between the sheet end portion and the reference image on the basis of the measurement result in FIG. 16.

The distance L1 is obtained from the calculated distances from the sheet end portion Se and the focus position of the trim mark (L2 and L3, respectively) and the distance (L4) calculated from the time when each of the sheet end portion Se and the trim mark passes the reader 1s, respectively. The distance L1 is obtained from an equation (2) by using the Pythagorean theorem:

$$L1=\{(L4)^2+(L2+L3)^2\}^{1/2} \qquad (2).$$

[Processing Example for Correcting Image Forming Position on the Basis of Distance Between Sheet end Portion and Reference Image]

Hereinafter, an outline of an operation of the image forming apparatus 10 will be described.

Figure 18:
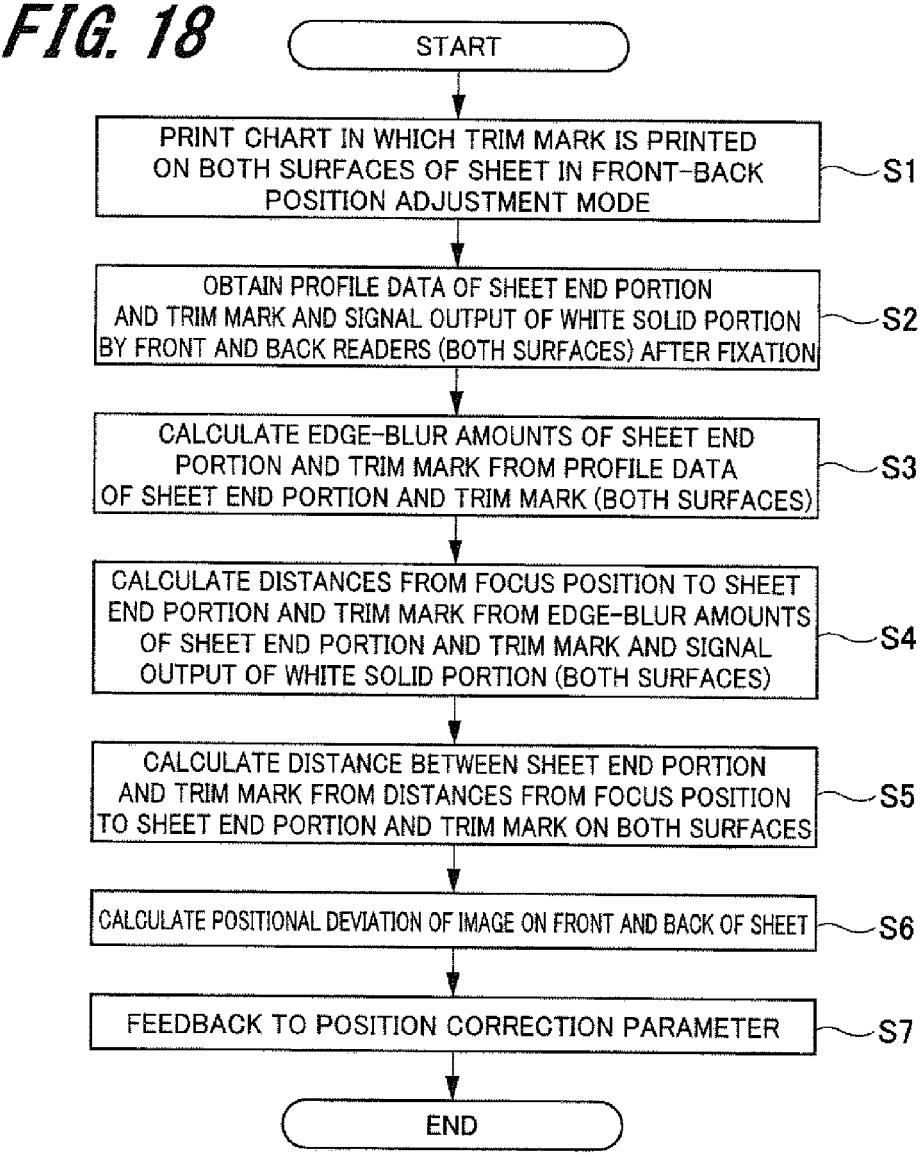
FIG. 18 is a flowchart showing a processing example by the image forming apparatus according to the embodiment of the present invention.

FIG. 18 is a flowchart showing a processing example by the image forming apparatus 10 according to the embodiment of the present invention. The controller 100 realizes the processing shown in FIG. 18 by executing the program recorded in the ROM or the storage device 101.

First, the controller 100 of the image forming apparatus 10 proceeds to a front/back position adjustment mode on the basis of an operation signal input from the operation portion 102 or job information transmitted via a network, not shown. Then, the controller 100 forms a chart in which a trim mark is printed on the both surfaces of the sheet by controlling the image forming portion 11 at the time of the front/back position adjustment mode (S1).

Next, after the chart including the trim mark is fixed on the sheet by the fixation portion 31, the controller 100 obtains, from the front and back readers 1s and 1b, image data (profile data) of the sheet end portion and the trim mark (FIGS. 12 and 13) and the signal outputs (FIG. 16) of the white solid portion in the sheet end portion and the trim mark portion (S2).

Subsequently, the height calculation portion 100a of the controller 100 calculates the respective edge-blur amounts of the sheet end portion and the trim mark from the image data of the sheet end portion and the trim mark (FIGS. 12 and 13), for the both surfaces of the sheet (S3).

After that, the height calculation portion 100a of the controller 100 calculates the distances (heights) from the focus position to the sheet end portion and the trim mark (FIGS. 14 and 16) from the edge-blur amounts of the sheet end portion and the trim mark, and the signal output of the white solid portion of the sheet end portion and the trim mark (FIG. 16), for the both surfaces of the sheet (S4).

Next, the distance calculation portion 100b of the controller 100 calculates the distance between the sheet end portion and the trim mark, from the distances from the focus position of the both surfaces of the sheet to the sheet end portion and the trim mark, for the both surfaces of the sheet (S5).

Subsequently, the position correction portion 100c of the controller 100 calculates positional deviation of the image (trim mark) with respect to the specified image forming position of the sheet on the basis of the calculated distance between the sheet end portion and the trim mark, for the both surfaces of the sheet (S6).

Then, the position correction portion 100c of the controller 100 feeds back the calculated positional deviation to the position correction parameter for correcting the image forming positions of the both surfaces of the sheet. The image forming portion 11 forms an image on the sheet by correction of the image forming position of the sheet on the basis of the position correction parameter in which the positional deviation is reflected.

The processing of at least the aforementioned Steps S1 to S5 is executed for the back surface of the sheet after the processing is executed for the front surface of the sheet.

In the aforementioned embodiment, even when the attitude of the sheet is not stable, the distance between the reference position of the sheet (sheet end portion or the like) and the reference image (trim mark or the like) can be accurately measured without adding a special device. Therefore, in the image forming apparatus, accurate correction of the image forming position of the sheet can be made by using the accurately measured distance between the reference position and the reference image of the sheet.

<2. Modification>

(Detecting Method Using Auxiliary Image)

Figure 19:
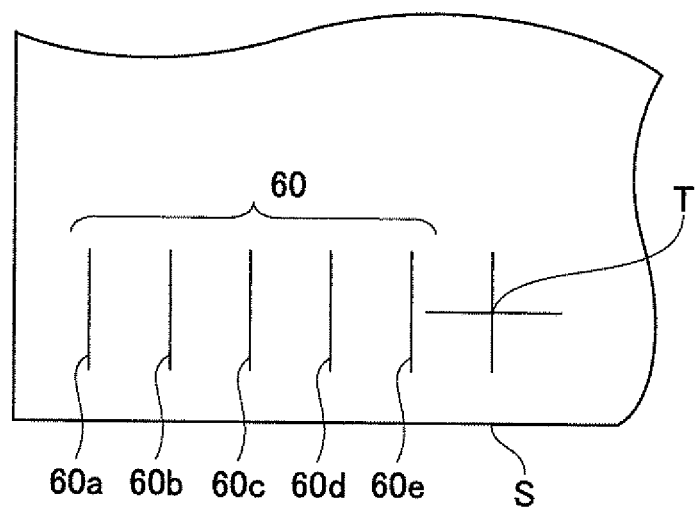
FIG. 19 is a view showing another example of the method of detecting the distance from the reference position to the reference image of the sheet according to the embodiment of the present invention.

FIG. 19 is a view showing another example of the method of detecting a distance from the reference position to the reference image of the sheet according to the embodiment of the present invention.

Figure 20:
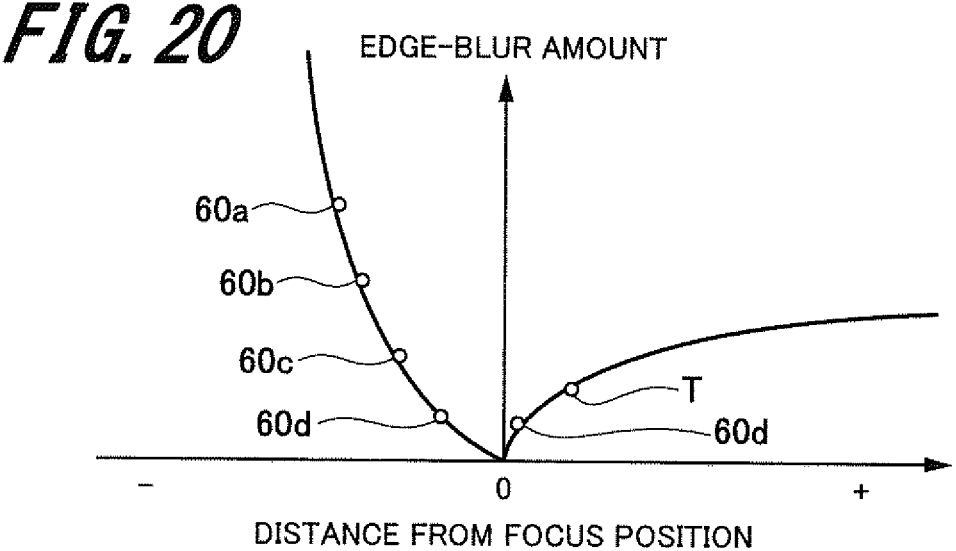
FIG. 20 is a view showing an example of the correlation between the edge-blur amount and the distance between the focus position and the reading surface, which reflects a plurality of the reference images (lines).

FIG. 20 is a view showing an example of the correlation between the edge-blur amount and the distance between the focus position and the reading surface, which reflects a plurality of auxiliary images (lines).

The image forming portion 11 forms a plurality of lines as the auxiliary images between the reference position (sheet end portion) and the reference image (trim mark T) of the sheet S. In FIG. 19, the auxiliary images are lines 60a to 60e in parallel with the main scanning direction and at equal intervals. When the lines 60a to 60e are not particularly distinguished or collectively referred to, they are referred to as the lines 60. The readers 1s and 1b read the sheet surface on which the plurality of lines 60 is formed between the sheet end portion and the trim mark T, and obtain image data.

The height calculation portion 100a of the controller 100 calculates the distance (height) to the focus position at positions of each of the sheet end portion, the lines 60a to 60e, and the trim mark T (FIG. 20) and the distance between the adjacent points in the sheet conveying direction, on the basis of the image data of the sheet surface read by the readers 1s and 1b. Next, the distance calculation portion 100b calculates a micro distance between the adjacent points, by using the distance (height) to the focus position at the respective positions of the sheet end portion, the lines 60a to 60e, and the trim mark T and the distance between the adjacent points in the sheet conveying direction. Then, the distance calculation portion 100b calculates the distance between the sheet end portion and the trim mark T by integrating the micro distances between the adjacent points. It is assumed that the sheet conveying speed is constant and the intervals between the plurality of lines 60a to 60e are constant.

The distance between the sheet end portion and the trim mark can be further calculated along the attitude of the sheet by adopting the aforementioned detecting method, and thus accuracy of the image position correction is enhanced.

(Positional Deviation in Main Scanning Direction)

As described above, as to the readers 1s and 1b, a line sensor can be used as a linear reader extending in the main scanning direction orthogonal to the sheet conveying direction. In relation to the positional deviation in the main scanning direction, the profile data in the main scanning direction is detected at the trim marks on the both ends (the trim marks T1 and T2 or the trim marks T3 and T4), respectively, from the detection result of the line sensor, and the same processing as that at the time of correction in the sheet conveying direction is executed for correction. However, there is no conversion from time to distance executed at the time of correction in the sheet conveying direction when the profile data is obtained. As described above, the distance between the end portion on the downstream side of the sheet S in the sheet conveying direction and the trim mark T, and the distance between the end portion (side end portion) of the sheet S along the sheet conveying direction and the trim mark can be calculated from the image data obtained by the line sensor.

Hereinbefore, the embodiment to which the invention made by the inventor is applied has been described above. However, the present invention is not limited to the description and the drawings, which form a part of disclosure of the invention according to the aforementioned embodiment, but various modifications can be performed within a range not departing from the gist of the invention described in claims.

Furthermore, in the aforementioned embodiment, the example in which the present invention is applied to the image forming apparatus that forms a color image has been described, but the present invention may be applied to an image forming apparatus that forms a monochromic image.

REFERENCE SIGNS LIST 1s, 1b detector
5 image inspecting apparatus
10 image forming apparatus
22a image forming portion
22a to 22c conveying roller
31 fixation portion
60, 60a to 60e line
100 controller
100a height calculation portion
100b distance calculation portion
100c position correction portion
101 storage device
L1, L2, L3, L4 distance
Pf reference surface (focus position)
SP1, SP2 irradiation spot
T, T1 to T4 trim mark

What is claimed is:
1. An image inspecting apparatus comprising:
   a scanner configured to irradiate, with light, a sheet surface of a sheet formed with a reference image for alignment and to obtain image data by reading the sheet surface by receiving light reflected on the sheet surface;
   a storage configured to previously store a first correlation between an edge-blur amount of a rising edge portion and/or a falling edge portion of the image data obtained using the scanner and a distance from a focal point of the scanner to the sheet surface; and
   a hardware processor configured to calculate the edge-blur amount from the image data obtained by the scanner, to calculate heights of the reference position and the reference image of the sheet, using the focal point of the scanner as a base point on the basis of the calculated edge-blur amount and the first correlation stored in the storage, to calculate a distance between the reference position and the reference image on the sheet surface by using the heights of the reference position and the reference image and the distance between the reference position and the reference image in a sheet conveying direction, and to output an image on the sheet at a corrected image forming position based on the distance between the reference position and the reference image.

2. The image inspecting apparatus according to claim 1, wherein
   the storage previously stores a second correlation between a reflected light amount received by the scanner and a distance from the focal point of the scanner to the sheet surface; and
   the hardware processor determines whether the sheet surface is on a side closer to the scanner or on a side farther therefrom with respect to the focal point of the scanner on the basis of the reflected light amount received by the scanner and the second correlation, and calculates heights of the reference position and the reference image of the sheet, using the focal point of the scanner as a base point on the basis of a determination result.

3. The image inspecting apparatus according to claim 1, wherein
   the scanner reads a sheet surface on which a plurality of auxiliary images is formed between the reference position and the reference image of the sheet; and
   the hardware processor calculates a distance between mutually adjacent points among the reference position, the plurality of auxiliary images, and the reference images on the basis of the image data of the sheet surface read by the scanner, and calculates a distance between the reference position and the reference image on the sheet surface by adding the distance between the mutually adjacent points.

4. The image inspecting apparatus according to claim 1, wherein
   the scanner is a linear scanner extending in a main scanning direction orthogonal to the sheet conveying direction;
   the reference image is formed respectively near an end portion on a downstream side of the sheet in the sheet conveying direction and near an end portion of the sheet along the sheet conveying direction; and
   the hardware processor calculates a distance between the end portion on the downstream side of the sheet in the sheet conveying direction and the reference image and the distance between the end portion of the sheet along the sheet conveying direction and the reference image, from the image data obtained by the linear scanner.

5. An image forming apparatus, comprising:
   an image forming portion configured to form an image on a sheet;
   a scanner configured to irradiate, with light, a sheet surface of a sheet formed with a reference image for alignment by the image forming portion and to obtain image data by reading the sheet surface by receiving light reflected on the sheet surface;
   a storage configured to previously store a first correlation between an edge-blur amount of a rising edge portion and/or a falling edge portion of the image data obtained using the scanner and a distance from a focal point of the scanner to the sheet surface; and
   a hardware processor configured to measure a distance between a reference position and a reference image on the sheet surface read by the scanner, and to correct an image forming position of the sheet in accordance with the distance, wherein
   the hardware processor is further configured to calculate the edge-blur amount from the image data obtained by the scanner, to calculate heights of the reference position and the reference image, using the focal point of the scanner as a base point on the basis of the calculated edge-blur amount and the first correlation stored in the storage, to calculate a distance between the reference position and the reference image on the sheet surface by using the heights of the reference position and the reference image and the distance between the reference position and the reference image in a sheet conveying direction, and to control the image forming portion to output the image on the sheet at the corrected image forming position based on the distance between the reference position and the reference image.

6. The image forming apparatus according to claim 5, wherein the image forming portion forms a reference image for alignment of both surfaces respectively on a front surface and a back surface of a sheet;

the hardware processor measures a distance between end portions of the front surface and the back surface and the reference image using the end portions of the front surface and the back surface read by the scanner as reference positions, and performs alignment of the both surfaces by changing an image forming position on the front surface or the back surface by the image forming portion so that each of the measured distances on the front surface and the back surface coincides with each other.

\* \* \* \* \*